UNITED STATES PATENT OFFICE.

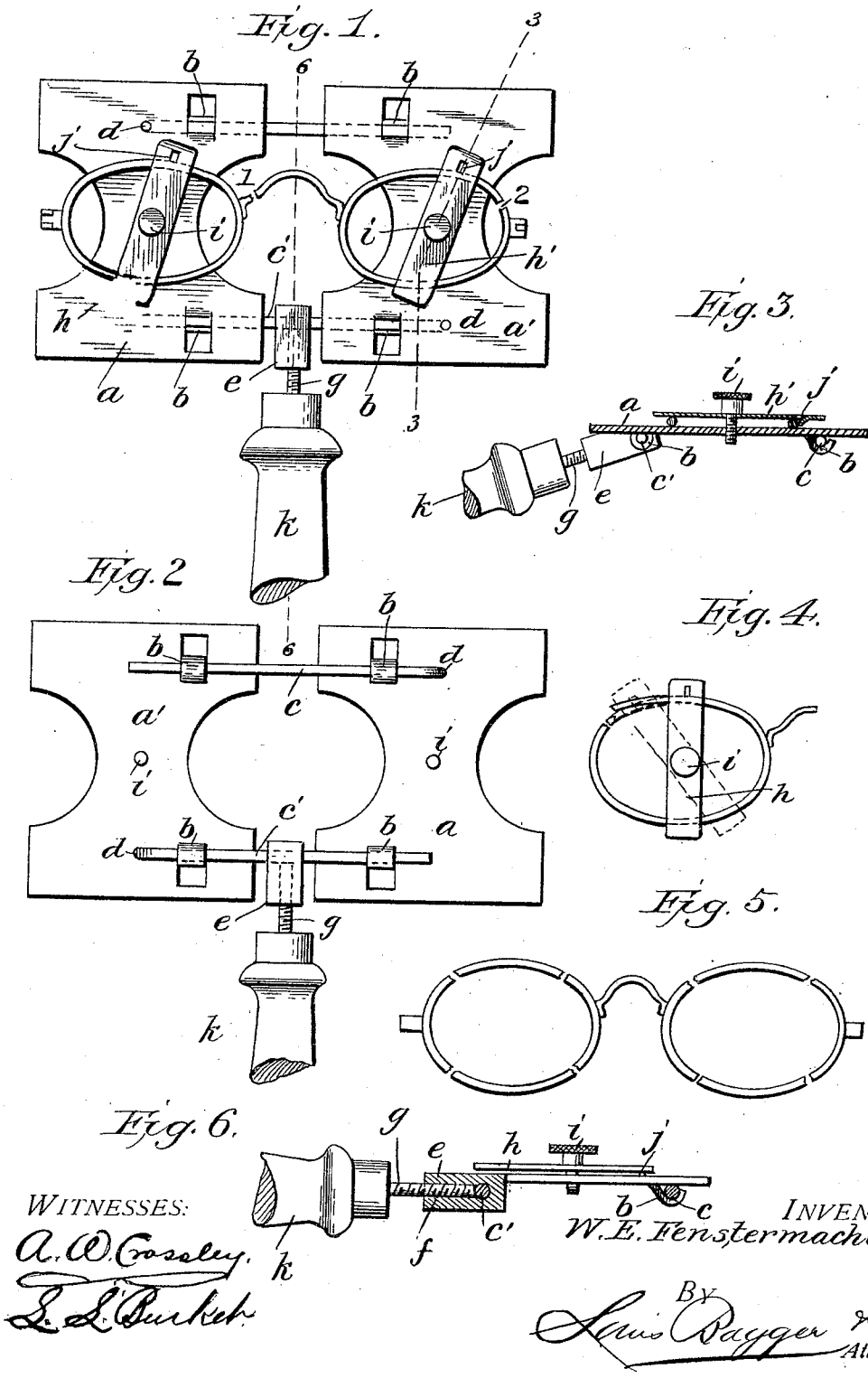

WILLIAM E. FENSTERMACHER, OF BELOIT, KANSAS.

SPECTACLE-SOLDERING CLAMP.

No. 799,552.     Specification of Letters Patent.     Patented Sept. 12, 1905.

Application filed September 30, 1903. Serial No. 175,232.

*To all whom it may concern:*

Be it known that I, WILLIAM E. FENSTERMACHER, a citizen of the United States, residing at Beloit, in the county of Mitchell and State of Kansas, have invented an Improved Spectacle-Soldering Clamp, of which the following is a specification.

This invention has relation to jewelers' soldering-clamps for use in mending small broken articles by the process of soldering, and particularly spectacles and eyeglass-frames.

It is the object of the invention to improve soldering-clamps of the kind mentioned to the end of rendering them more efficient and durable than heretofore and to also extend or enhance their degree of usefulness.

What the improvements are that I have made and the manner in which the said objects are carried into effect may be ascertained from the following specification, reference being had to the annexed drawings, and to the characters of reference marked thereon, forming a part of the said specification, of which—

Figure 1 is a plan view of my improved soldering-clamp with an eyeglass-frame clamped in position thereon to effect a soldering of a break in the nose-bridge. Fig. 2 is a bottom view of the same. Fig. 3 is a sectional view taken in the plane 3 3, Fig. 1. Fig. 4 is a diagram illustrating a feature of the invention employed to hold or control the eye-wire in the use of the invention. Fig. 5 is a diagram showing the points where eyeglass and spectacle frames are liable to break and require repair. Fig. 6 is a sectional detail taken on the line 6 6, Fig. 1.

In the drawings, $a\ a'$ designate two plates which together form what I, for the purposes of this specification, term a "supporting-table." Swaged down from the opposite sides of each plate and from nearer their inner than their outer ends are pieces $b$, which are bent to form frictional bearings for the connecting rods or wires $c\ c'$, one bent end of each rod extending through a hole formed in one of the plates, as at $d$, while the other end is free. A block $e$, pivoted on one of the rods, has a screw-threaded hole $f$ tapped into it, in which the screw-threaded end of a short rod $g$, projecting from the inner end of the handle, is tapped or turned, so that the handle may by adjusted at any angle or position that may be desired and then be tightened up and held in place, as will be fully understood from a casual observance of the drawings. Each side of each plate $a\ a'$ has a substantially half-circular part cut away, as shown, to form openings through the table, through which soldering of the frames at the broken points can be effected.

$h\ h'$ designate clamps consisting of bars of metal having small thumb-screws $i$ passed through holes formed through their substantial centers and tapped into the plates $a\ a'$, so that frames placed between the plates and bars may be clamped and held in position by means of the said screws.

$j$ designates lugs formed on the under side near the end of each clamp-bar $h\ h'$. These lugs may be swaged out of the bars themselves, and, indeed, by preference I so form them.

$k$ designates the handles, hereinbefore mentioned, of the invention.

In the use of the invention, supposing the nose-bridge of an eyeglass-frame to be broken at 1, the parts of the frame will be clamped in place on the table, as represented in Fig. 1, bringing the broken ends together, as indicated, when they may be connected by solder with the greatest facility. In all cases the eyeglasses will be removed from the frames before any soldering operation is attempted to avoid liability of breaking the glasses by heat. Should the eye-wire be broken, as at 2, the said wire will be clamped in place, as shown on the right in Fig. 1, and the clamp-bar $h'$ turned to such position as that its lug $j$ will engage the wire, and by twisting the latter a little bring the two broken ends together to be soldered through the opening in the side of the table. It is well known that when an eyeglass-wire becomes broken at any point the broken ends have a tendency to spring apart, and in mending them by solder it is necessary that the ends should be brought together and so held until the soldering is effected. This, as seen, could hardly be effected by the clamp-bars without the lugs thereon to engage and press upon the eye-wires. In Fig. 4 I have by a diagram shown how the eye-wire, broken at another point, may be held by the clamp-bar with its lug $j$ bearing on the wire, so as to bring the two parted ends together to be mended. When a broken frame is clamped in place upon the table, the plates may be separated more widely or be brought nearer together by simply pulling upon them to separate them or by crowding them toward each other. The friction of the bearings $b$ upon the rods $c\ c'$ will be sufficient to hold the plates of the table in any position to which they may be adjusted. The description of the manner of using the invention has been so fully and clearly explained in connection with the description of the structural characteristics of the same that it seems unnecessary to say anything further as to its mode of use.

I do not limit myself to the exact form of the details of the invention, nor do I confine myself to using it in repairing or soldering any particular article, but may use it in any manner found best upon any article desired.

I claim—

1. In a jeweler's soldering-clamp, a table consisting of two plates, rods extending between the same, and frictional bearings for the rods whereby the plates may be brought and held nearer together or farther apart and a clamping-bar on each plate.

2. In a jeweler's soldering-clamp, a table consisting of two plates, frictionally joined, each plate having a rounded portion removed from each of its sides and a clamping-bar on each plate.

3. A jeweler's soldering-clamp, embodying a table consisting of two plates frictionally adjustable toward and from each other, each plate having a circular portion removed from each of its sides, combined with a clamping-bar provided on its under side with a lug on each plate.

4. A jeweler's soldering-clamp embodying a table consisting of two plates, two rods extending between the plates and having frictional bearings for connecting the said plates and for frictionally holding the same in any position to which the plates may be moved relatively to each other, combined with a handle connected with one of said rods, whereby the clamp may be manipulated.

5. A jeweler's soldering-clamp embodying a table consisting of two plates, two rods extending between the plates and having frictional bearings for connecting the said plates and for frictionally holding the same in any position to which the plates may be moved relatively to each other, and a clamping-bar on each of the plates.

WILLIAM E. FENSTERMACHER.

Witnesses:
IRA. F. WILLIAMS,
FRANK M. BARTON.